United States Patent [19]

Rubner

[11] Patent Number: 4,916,211

[45] Date of Patent: Apr. 10, 1990

[54] THERMOCHROMIC CROSS POLYMERIZED POLYAMIDE-DIACETYLENE COMPOUND

[75] Inventor: Michael F. Rubner, Chelmsford, Mass.

[73] Assignee: GTE Laboratories Incorporated, Waltham, Mass.

[21] Appl. No.: 266,905

[22] Filed: Nov. 3, 1988

Related U.S. Application Data

[62] Division of Ser. No. 837,524, Mar. 7, 1986, Pat. No. 4,849,500.

[51] Int. Cl.[4] .................. C08G 69/46; C08G 69/48
[52] U.S. Cl. .................................... 528/480; 522/164; 522/176; 525/345; 525/420
[58] Field of Search ............... 528/480, 345; 522/164, 522/176; 525/420

[56] References Cited

U.S. PATENT DOCUMENTS 4,814,404  3/1989  Matsuda et al. .................... 528/345

Primary Examiner—Harold D. Anderson
Attorney, Agent, or Firm—Hamilton, Brook, Smith & Reynolds

[57] ABSTRACT

Polyamide compositions which contain as part of their repeat structure a reactive diacetylene groups are disclosed. The cross-polymerized products of these polyamides are thermochromic polydiacetylene compounds. The compositions of the present invention do not exhibit a hysteresis effect during temperature cycling.

4 Claims, 8 Drawing Sheets

THERMOCHROMIC CROSS POLYMERIZED POLYAMIDE-DIACETYLENE COMPOUND

This application is a division of application Ser. No. 837,524, filed Mar. 7, 1986, now U.S. Pat. No. 4,849,500.

FIELD OF THE INVENTION

This invention is in the field of polymer chemistry and more specifically relates to a new class of polyamides which incorporate diacetylene units in their repeat unit.

BACKGROUND OF THE INVENTION

The diacetylene group, —C≡C—C≡C—, is a highly reactive functionality that, in the correct solid-state geometry, can be topochemically polymerized using heat, chemical radicals, or radiation into a fully conjugated polymer with extensive pi-electron delocalization along its main chain backbone. See Wegner, G. (1979) "MOLECULAR METALS", W. E. Hatfield, ed., Plenum Press, New York and London, 209-242. Since the polymerization is topochemical, the kinetics of the reaction and the structure of the final product can be directly attributed to the geometric arrangement of the reacting groups in the solid-state. See Baughman, R. H., *J. POLYM. SCI. POLYM. PHYS. ED.*, 12, 1511 (1974).

The fully extended unsaturated backbone of the polydiacetylenes gives rise to many of the novel properties of these materials, such as their highly anisotropic optical, electrical, dielectric, and mechanical properties. In particular, polydiacetylenes have been found to exhibit large nonlinear optical susceptibilities comparable to inorganic semiconductors, making them attractive materials for optical signal processing. See Muller, H., Eckhardt, C. J., Chance, R. R., and Baughman, R. H., *CHEM. PHYS. LETT.*, 50, 22 (1979). This is a direct consequence of the strong variations in the polarizability of the backbone which result from the one-dimensional nature of this system. Also, in some cases, it is possible to prepare large area nearly defect-free single crystals of polydiacetylenes which offer unique optical properties. See Baughman, R. H., Yee, K. C., *J. POLYM. SCI. MARCROMOL. REV.*, 13, 219 (1978).

The vast majority of diacetylene monomers that have been prepared and polymerized are relatively small molecules which readily crystallize from melt or solution. Generally, monomers in which a diacetylene group is flanked on both sides with various organic substituents have received the most amount of attention.

By varying the composition of these organic substituents, it is possible to obtain a wide variety of polydiacetylenes with a range of physical properties. For example, Patel et al. reported the synthesis of soluble polydiacetylenes obtained by incorporating bulky side groups with the structure, $-(CH_2)_n-OCONHCH_2COOC_4H_9$ (n=3 or 4), in the monomer. See Patel, G. N., Chance, R. R., and Witt, J. D., *J. CHEM. PHY,* 70, 4387 (1979). Here, dissolution was encouraged by an increase in the entropy content of the polymer brought about by surrounding the conjugated backbone with these flexible bulky sidegroups. Molecular weight determinations on these and other soluble polydiacetylenes indicate the average molecular weights to be around $10^5-10^6$ g/m. See Patel, G. N., Walsh, E. K., *J. POLYM. SCI. POLYM. LETT.* 17, 203 (1979); Wegner, G., and Wenz, G., *MOL. CRYST. LIQ. CRYST.,* 96, 99-108 (1983).

Surface active polydiacetylenes have also been prepared by fitting the diacetylene monomer with a hydrophobic "tail" group on one side of the molecule and a hydrophilic "head" group on the other. See Tieke, B., Lieser, G., and Wegner, G., *J. POLYM. SCI. POLYM. CHEM. ED.,* 17, 1631-1644 (1979). Such monomers can be manipulated at the air-water interface of a Langmuir-Blodgett film balance and subsequently polymerized into a polymer monolayer. This technique is currently being used to fabricate controlled thickness multilayers of polydiacetylenes suitable as optical waveguides. See Garter, G. M., Chen, Y. J., and Tripathy, S. K., *APPL. PHYS. LETT.,* 43, 891 (1983). The polymerization of the diacetylene groups is believed to proceed via a 1, 4 addition polymerization. Wegner, G., MOLECULAR METALS, 209-242 (Plenum Press, 1979).

In addition to the polymerization of monomeric diacetylenes, it has been demonstrated that the diacetylene functionality can be incorporated in the repeat structure of a polymer backbone. These types of polymers undergo solid-state cross-polymerization on exposure to U.V. radiation forming polydiacetylenes chains.

These materials have been referred to as macromonomers due to the systematic polymerization of the diacetylene units within the backbone structure of the initial polymer giving rise to a final network-like structure consisting of polymer chains both normal and parallel to the original chain direction. The term cross-polymerized is used to indicate that polymer chains are formed at regular intervals along the original polymer backbone as opposed to the typical random cross-linking that many polymers undergo when exposed to radiation. Examples of polymers containing the reactive diacetylene functionality in the repeat structure of the polymer backbone include polyurethane and polyester polymers formed by linking the appropriate difunctional monomers together and wherein one of which contains the diacetylene group. See Wegner, G., *DIE MAKROMOLEKULARE CHEMIE,* 134, 219-229 (1970). Alternatively, it has been found that these polymers can be synthesized by the oxidative coupling of terminal diacetylenes. See Hay, A. S., Bolon, D. A., Leimer, K. R., and Clark, R. F. *POLYMER LETTERS* 8, 97-99 (1970). Using this chemistry, Hay et al. prepared polymers based upon bispropargyl ethers of bisphenols which incorporate the diacetylene unit as part of their repeat structure. In addition, using similar chemistry, polymers of the type $(-(CH_2)_n-C≡C-C≡C-)_x$ have been prepared. See Day, D. and Lando, J., *J. POLYM. SCI., POLYM. LETT. ED.,* 19, 227 (1981); Thakur, M. and Lando, J., *MACROMOLECULES,* 16, NO. 1, 143 (1983). In this case, it was shown that the polymers undergo a systematic cross-polymerization via the diacetylene unit to produce network-like polymers.

Polydiacetylenes have also been described which exhibit thermochromic properties. The term "thermochromic" as used herein refers to a reversible color change upon heating or cooling which is observed for many of the polydiacetylenes. It can not be predicted whether or not a diacetylene will polymerize. Furthermore, if the diacetylene does polymerize, it is not possible to predict whether or not the polydiacetylene produced will exhibit reversible thermochromic properties. See, "Polydiacetvlenes" Advances in Polymer Science, Cantow, H. J. Ed., *63* (Springer Verlag ed., Berlin, Heidelberg 1984).

The usefulness of the thermochromic polydiacetylenes which do exhibit reversible thermochromic properties has been limited due to the fact that they exhibit a hysteresis effect. A polydiacetylene exhibits a hysteresis effect when the material, after it has been heated to induce the desired color change above the thermochromic transition temperature, must be cooled below and, in some cases, substantially below the thermochromic transition temperature, to a temperature designated the "hysteresis transition temperature" whereupon the original color reappears. See U.S. Pat. No. 4,215,208, Yee et al. 1980.

SUMMARY OF THE INVENTION

In accordance with the present invention, there is provided polyamide compositions which contain as part of their repeat structure a reactive diacetylene group. Each polyamide composition is selected from the group consisting of polyamides having the formula:

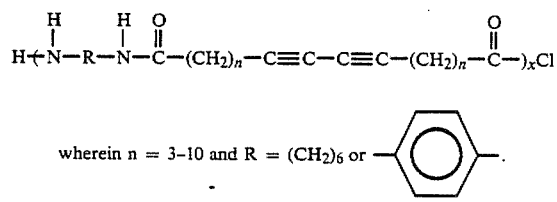

wherein $n = 3–10$ and $R = (CH_2)_6$ or —⟨phenyl⟩—.

Also disclosed are the above-described polyamides which have had their diacetylene units cross-polymerized to provide thermochromic properties.

It has been unexpectedly found that in contrast to the thermochromic polydiacetylene compounds of the prior art, thermochromic polyamide diacetylene compounds of the present invention do not exhibit a hysteresis effect during temperature cycling.

DETAILED DESCRIPTION OF THE INVENTION

This invention is comprised of a new class of polyamides which incorporate diacetylene units in their repeat unit. This produces a polyamide material which can be cross-polymerized in the solid state into a conjugated network polymer exhibiting the unique optical properties of the polydiacetylenes and the desirable physical attributes of the polyamides. It has been unexpectedly found that, in contrast to the thermochromic polydiacetylene compounds of the prior art, thermochromic polyamide-diacetylene compounds of the present invention do not exhibit a hysteresis effect during temperature cycling.

The polyamide-diacetylene macromonomers of this invention were prepared using an interfacial or solution condensation polymerization technique as shown by the following general reaction for the interfacial technique.

NYLON-TYPE DIACETYLENE MACROMONOMERS
PREPARATION VIA INTERFACIAL POLYMERIZATION

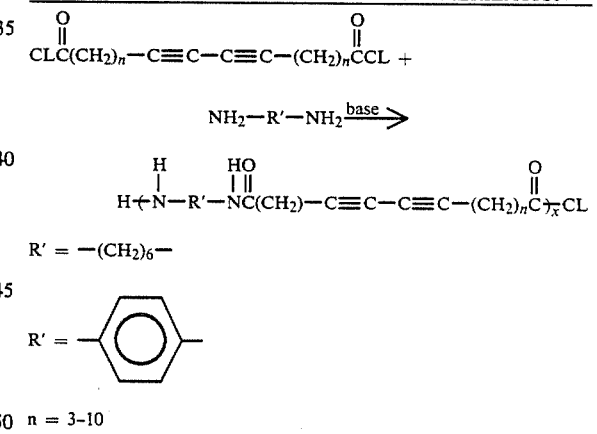

$n = 3–10$

These materials are designated by the number of methylene groups surrounding the diacetylene group in the backbone of the polymer and the type of diamine used to prepare them. For example, 8,8 aliphatic polyamide-diacetylene refers to a polymer prepared from 10,12 docosadiyne 1,22 dioic acid and the aliphatic diamine hexamethylenediamine. 8,8 Aromatic polyamide-diacetylene, on the other hand, refers to a polymer prepared from 10,12 docosadiyne 1,22 dioic acid and the aromatic diamine p-phenylenediamine.

The 8,8 aliphatic polyamide-diacetylene macromonomers ($R=(CH_2)_6$) is formed as a fiber-like material which is off-white colored in appearance. Upon exposure to UV radiation (254 nm of 5 mW/cm² intensity), the polymer turns dark purple indicative of cross-polymerization and the formation of a conjugated pi-electron system. The 8,8 aromatic polyamide-diacetylene macromonomer, on the other hand, is formed as a white powder which turns deep blue after UV exposure. Prior to cross-polymerization, both nylon type macromonomers are soluble in m-cresol and can be cast into films from this solvent. The solubility of these materials in m-cresol indicates that cross-polymerization has not occurred to any great extent during synthesis and thus the macromonomer still behaves as a linear polyamide. This in turn suggests that these materials may be processed using techniques established for other nylon polymers.

Figure 1:
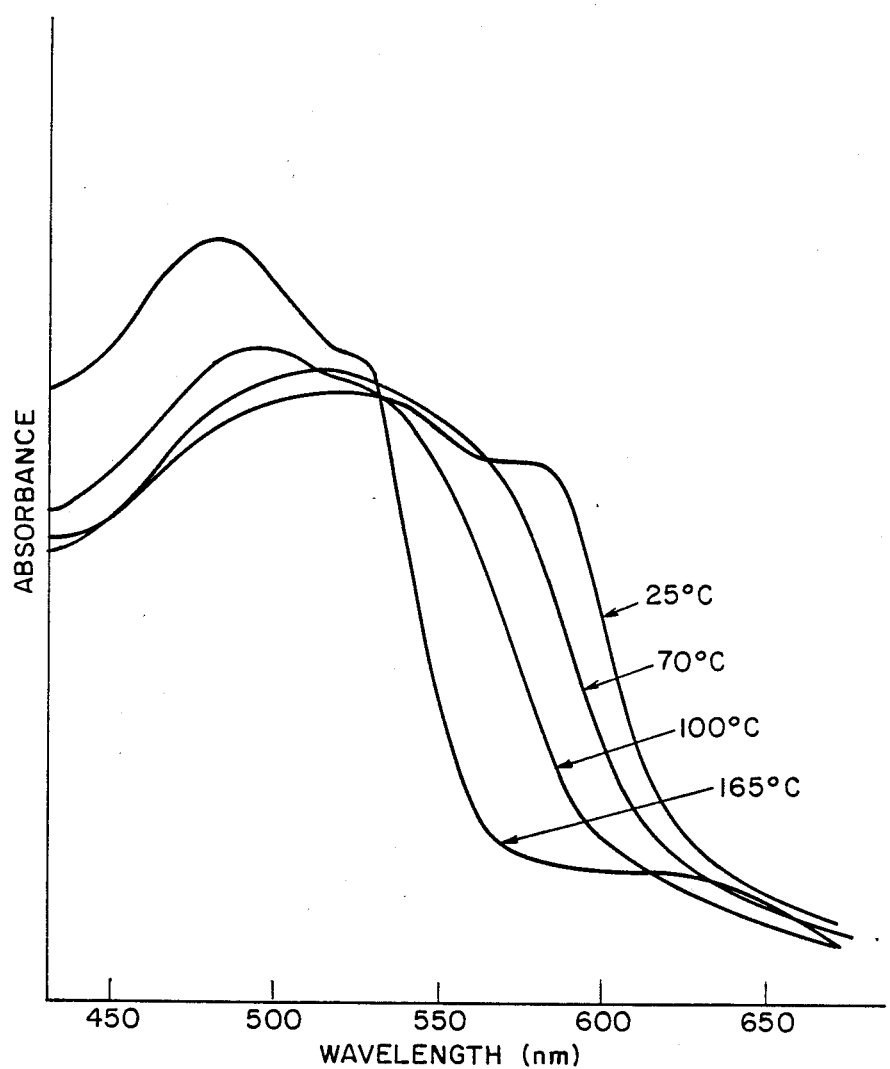
FIG. 1 depicts the graph of the visible absorption spectra of the cross-polymerized 8,8 aliphatic polyamide-diacetylene recorded as a function of temperature.
Figure 2:
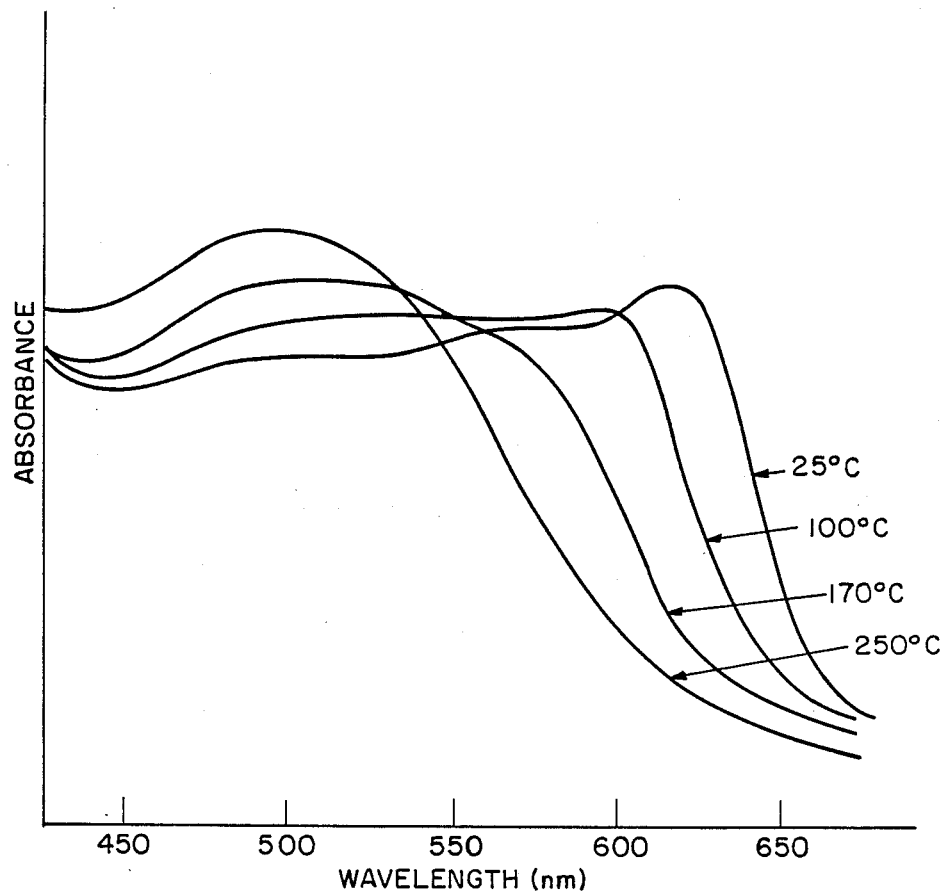
FIG. 2 depicts the visible absorption spectra of the cross-polymerized 8,8 aromatic polyamide-diacetylene recorded as a function of temperature.

The polyamide-diacetylene macromonomers were found to exhibit reversible thermochromic properties after cross-polymerization. The visible absorption spectra taken on thin films of cross-polymerized samples as a function of temperature are shown in FIGS. 1 and 2. From these figures, it can be observed that the peaks in the absorption bands of these materials change significantly as the temperature is changed. In the case of the material in which $R=(CH_2)_6$, the color changes continuously from purple to red as the temperature is increased. When R=

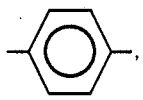

the color change is from blue to red. In both cases, the color changes were reversible. The materials could be repeatedly cycled between room temperature and a maximum higher temperature without any significant loss in optical characteristics at any temperature within this range. For the polyamide-diacetylene derived from the aromatic amine, R=

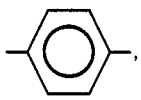

the maximum temperature was 200° C. and for the polyamide-diacetylene prepared from the aliphatic amine, $(R=CH_2)_6$, the maximum temperature for completely reversible thermochromic behavior was 140° C.

For the polyamide-diacetylene compositions with the general formula:

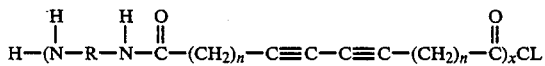

R can be any organic radical which can be incorporated into a polyamide. However, n is limited to n=3-10 due to the fact that if n is less than three the compounds no longer exhibit any thermochromic properties and if n is greater than 10, the large number of methylene groups surrounding the diacetylene groups begin to dominate the chemistry of the compounds produced. Due to the dominance of these methylene groups, the polyamide-diacetylene compound produced when n is greater than 10 are less likely to exhibit a reversible color change upon thermochromic transition, the resultant color change being irreversible. Variation in the structure of the diamine or diacid chloride used to prepare the macromonomers can also be used to further modify the properties of these materials.

The temperature-dependent optical properties of the cross-polymerized polyamide-diacetylene macromonomers combined with their nylon-like physical properties, and their lack of hyteresis during temperature cycling make these materials attractive candidates as temperature sensors in fiber optic sensor applications. In addition, by varying the amount of cross-polymerization in these materials, it is possible to obtain a material having a wide range of mechanical behavior that normally is not achievable in traditional polyamides.

Thus, the polyamide-diacetylene macromonomers of this invention represent a new class of polymers which exhibit a unique combination of optical and mechanical properties. These compounds and their properties are illustrated by the following examples.

EXAMPLE 1

Synthesis of a Polyamide-Diacetylene Polymer from an Aliphatic Diamine- 8,8 Aliphatic Polyamide-Diacetylene Materials used 2.3 grams of 10,12 docosadiyne 1,22 dioic acid
15 ml thionyl chloride
135 ml dry, freshly distilled carbon tetrachloride
6.16 grams of hexamethylenediamine
$H_2O$
Acetone
Chloroform Procedure 2.3 grams of 10,12 docosadiyne 1,22 dioic acid were added to a reaction flask equipped with a reflux condenser, a nitrogen purge and a means for mechanical stirring. Thionyl chloride (15 ml) was then added to the flask and the resultant solution was warmed to a gentle reflux which was maintained for three hours. At the end of the reaction, excess thionyl chloride was removed by vacuum distillation.

Dry freshly distilled carbon tetrachloride (135 ml) was then added to the newly formed diacid chloride. This solution was in turn transferred to an open breaker. 6.16 Grams of hexamethylenediamine dissolved in 70 ml of water was then slowly added to this solution. The two immisible solvents formed a two phase solution in which the desired polymer instantaneously formed as a thin membrane at the interface of the solutions. Fiber-like material was continuously pulled from the interface with tweezers until the reactants were exhausted. The polymer was then collected and washed with water, acetone and finally chloroform and vacuum dried for 24 hrs.

EXAMPLE 2

Synthesis of a Polyamide-Diacetylene Polymer from an Aromatic Diamine-8,8 Aromatic Polyamide-Diacetylene Materials Used 1.0 gram of 10,12 docosadiyne 1,22 dioic acid
10 ml thionyl chloride
45 ml dry, freshly distilled carbon tetrachloride
0.35 grams of p-phenylenediamine (recrystallized from warm chloroform and sublimed at 130° C.)
0.16 grams of sodium hydroxide
$H_2O$
Acetone
Chloroform

Procedure 1.0 gram of 10,12 docosadiyne 1,22 dioic acid was added to a reaction flask equipped with a reflux condenser, a nitrogen purge and a means for mechanical stirring. Thionyl chloride (10 ml) was then added to the flask and the resultant solution was warmed to a gentle reflux which was maintained for three hours. At the end of the reaction, excess thionyl chloride was removed by vacuum distillation.

Dry, freshly distilled carbon tetrachloride (45 ml) was then added to the newly formed diacid chloride and this solution was transferred to a high speed blender. To this rapidly stirring solution was added a solution of 0.35 grams of p-phenylenediamine and 0.16 grams of sodium hydroxide dissolved in 25 ml of water (over a period of about 15 seconds). After stirring the mixture for an additional 5 minutes, the resultant polymer was collected and then washed with water, acetone and finally chloroform and vacuum dried for 24 hours.

EXAMPLE 3

Synthesis of a Polyamide-Diacetylene Polymer from an Aromatic Diamine- 3,3 Aromatic Polyamide-Diacetylene

Materials Used 2.01 grams of 5,7 docosadiyne 1,12 dioic acid
15 ml of thionyl chloride
15 ml of dry, freshly distilled methylene chloride
0.981 grams of p-phenylenediamine (recrystallized from warm chloroform and sublimed at 130° C.)
2.54 ml of triethylamine
2.50 grams of triethylamine hydrochloride
30 ml of methylene chloride
$H_2O$
Acetone
Chloroform

Procedure

Step One: 2.01 grams of 5,7 docosadiyne 1,12 dioic acid was added to a reaction flask equipped with a reflux condenser, a nitrogen purge and a means for mechanical stirring. Thionyl chloride (15 ml) was added to the flask and the resultant solution was warmed to a gentle reflux which was maintained for three hours. At the end of the reaction, excess thionyl chloride was removed by vacuum distillation. Dry freshly distilled methylene chloride (15 ml) was then added to the newly formed diacid chloride.

Step Two: 0.981 grams of p-phenylenediamine, 2.54 ml of triethylamine, 2.50 grams of triethylamine hydrochloride and 30 ml of methylene chloride, were added to a reaction flask equipped with a reflux condenser, a nitrogen purge and a means for mechanical stirring. The solution prepared in step one was then added to this mixture over a period of 15 minutes. After stirring the mixture for 30 minutes, the resultant polymer was collected and then washed with water, acetone and finally chloroform and vacuum dried for 24 hours.

EXAMPLE 4

Thermal Analysis of 8,8 Aliphatic Polyamide-Diacetylene Before and After Cross-Polymerization of the Diacetylene Units by $CO^{60}$ Gamma Radiation.

Figure 3:
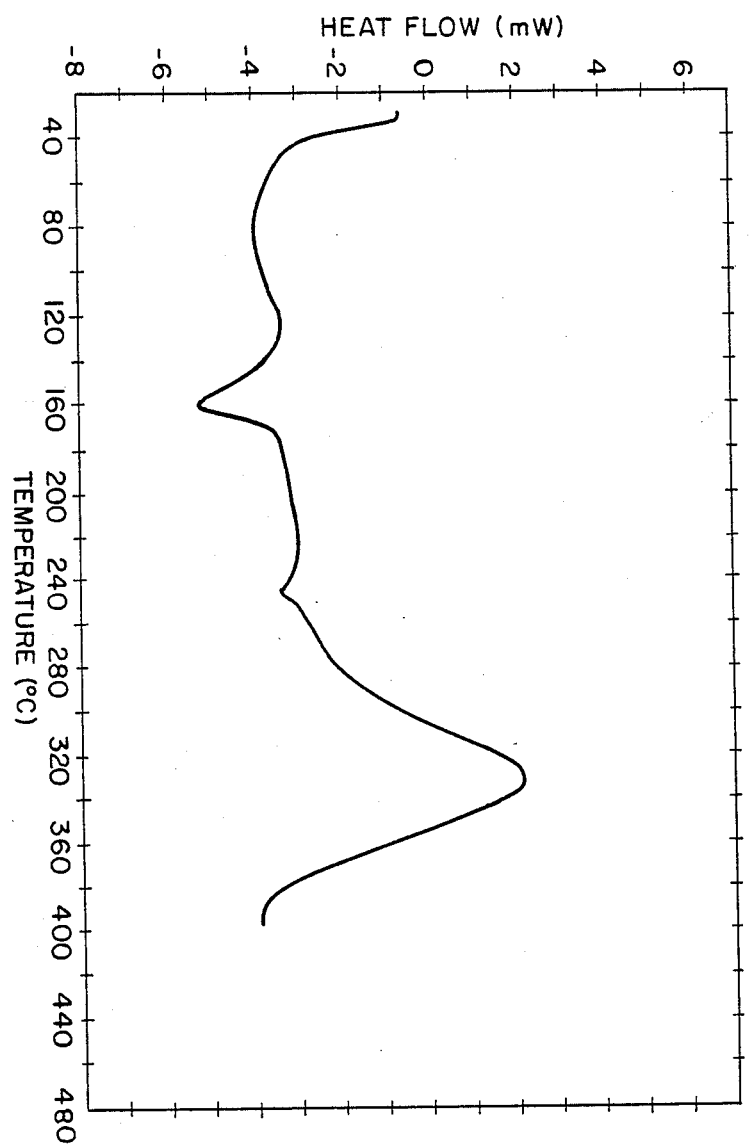
FIG. 3 depicts a graph of the differential scanning calorimetry scan of the 8,8 aliphatic polyamide-diacetylene before the cross-polymerization of the diacetylene groups.
Figure 4:
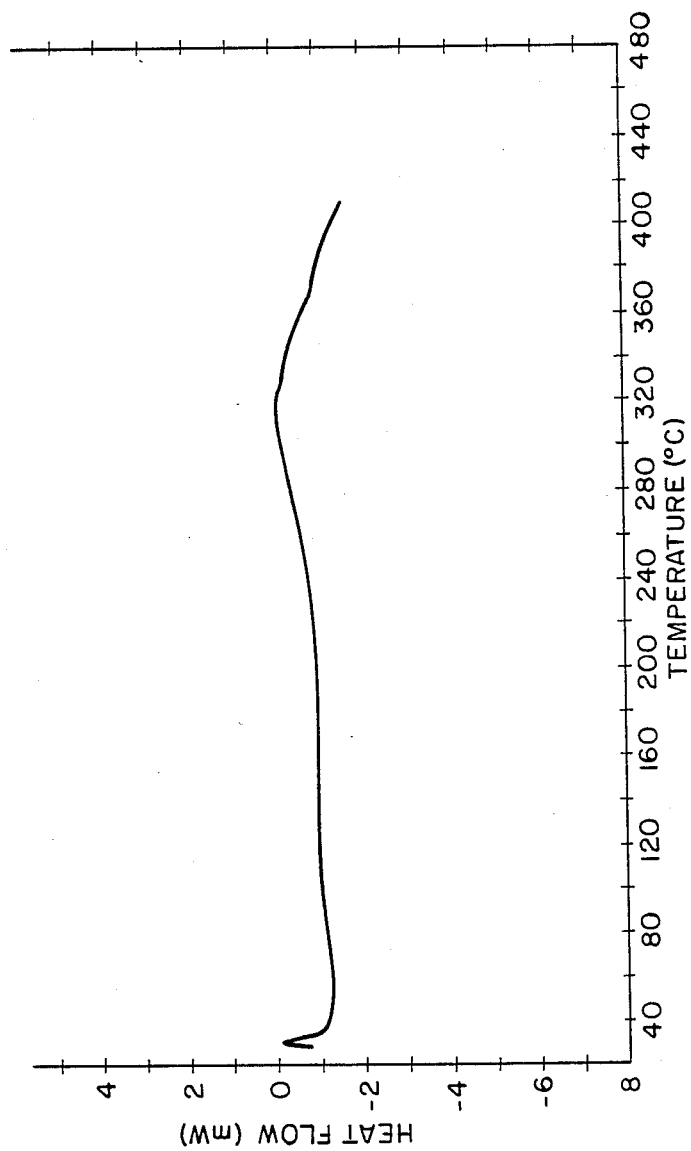
FIG. 4 depicts a graph of a differential scanning calorimetry scan of the 8,8 aliphatic polyamide-diacetylene after the cross-polymerization of the diacetylene groups by exposing the sample to $CO^{60}$ gamma radiation for two weeks.

Differential scanning calorimetry (DSC) scans of the 8,8 aliphatic polyamide-diacetylene were taken before and after cross-polymerization of the diacetylene groups. The large exotherm centered at about 340° C. in the as-prepared material (FIG. 3) is due to the thermally induced cross-polymerization and degradation of diacetylene units present in the backbone and hence is proportional to the number of these groups that are unreacted. After cross-polymerization of the diacetylene groups by exposing the sample to $CO^{60}$ gamma radiation for two weeks it can be seen (FIG. 4) that the endotherm has been dramatically reduced and that the melting exotherm at about 170° C. present in the as-prepared polymer has been eliminated. This shows that cross-polymerization by gamma radiation takes place via the diacetylene groups present in the backbone producing a material which does not exhibit any thermal transitions below 300° C. Thus, it is possible to modify the thermal properties of the polymer by controlling the extent of reaction of the diacetylene groups in the backbone.

EXAMPLE 5

Thermochromic Properties of 8,8 Aliphatic Polyamide-Diacetylene

The thermochromic properties were evaluated by casting thin films of the polymer onto a temperature-controllable transparent tin oxide coated glass substrate. The polyamide-diacetylene was cross-polymerized by exposing it to U.V. light of 5 $Mn/cm^2$ power density for 20 minutes before measurements were made. The visible absorption spectra of a thin film of cross-polymerized 8,8 aliphatic polyamide-diacetylene recorded as a function temperature are shown in FIG. 1. These spectra show that the position of the absorption band of this polymer in the visible portion of the spectrum is highly dependent on temperature. The color of the material changes continuously from purple to red as it is heated from room temperature to higher temperatures.

EXAMPLE 6

Thermochromic Properties of 8,8 Aromatic Polyamide-diacetylene

The thermochromic properties were evaluated by casting thin films of the polymer onto a temperature-controllable transparent tin oxide coated glass substrate. The polyamide-diacetylene was cross-polymerized before measurements were made. The visible absorption spectra of a thin film of cross-polymerized (20 minute exposure to UV light of 5 $Mw/cm^2$ power density) 8,8 aromatic polyamide-diacetylene recorded as a function temperature are shown in FIG. 2. These spectra show that the position of the absorption band of this polymer in the visible portion of the spectrum is highly dependent on temperature. The color of the material changes continuously from blue to red as it is heated from room temperature to higher temperatures.

EXAMPLE 7

Reversibility of Thermochromic Properties of 8,8 Aromatic Polyamide-diacetylene

Figure 5:
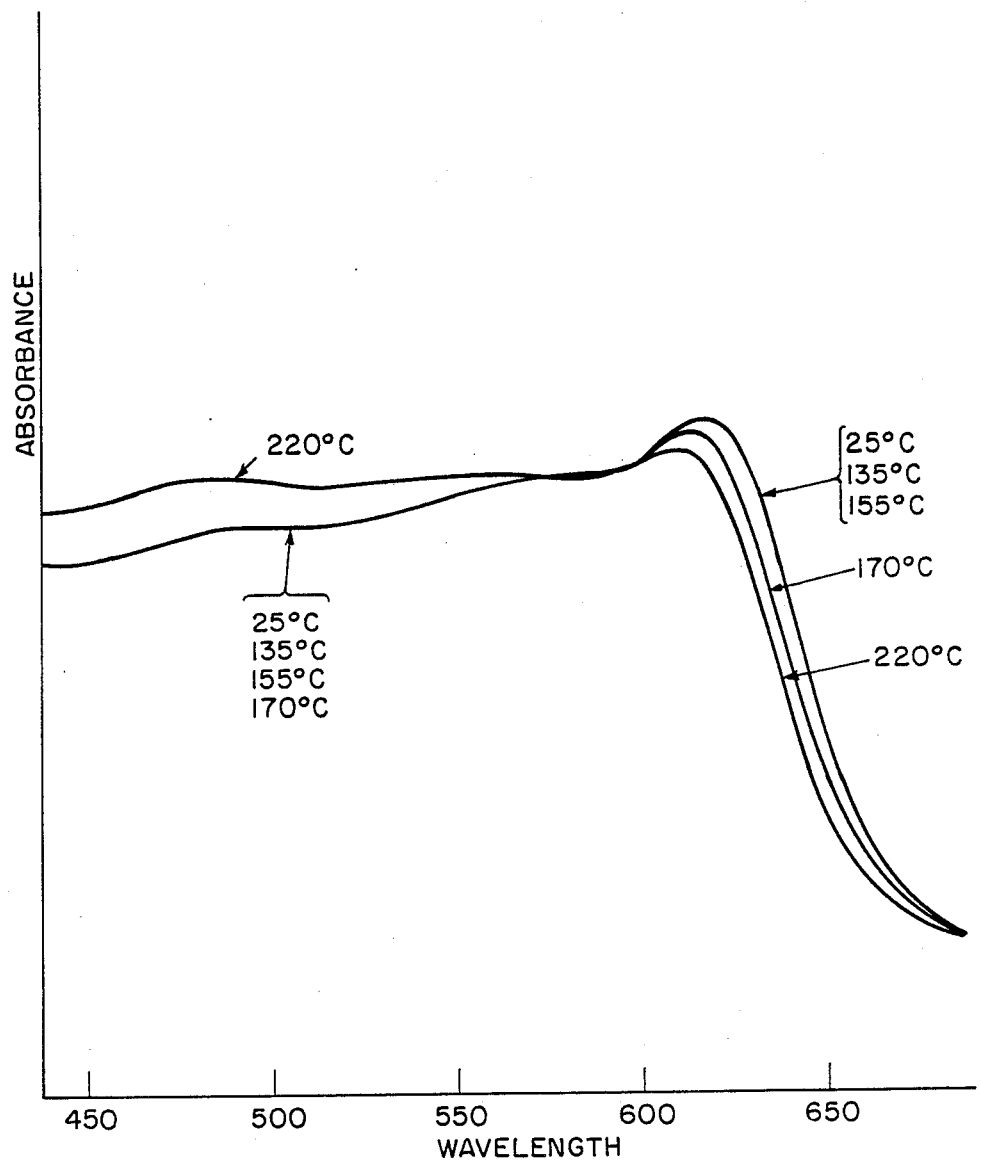
FIG. 5 depicts a graph of the visible absorption spectra of a thin film of cross-polymerized 8,8 aromatic polyamide-diacetylene recorded after heating to the indicated temperatures and cooling to room temperature.

The visible absorption spectra of a thin film of cross-polymerized (20 minute exposure to UV light of 5 $Mw/cm^2$ power density) 8,8 aromatic polyamide-diacetylene recorded after heating to the indicated temperatures and cooling to room temperature are shown in FIG. 5. It can be seen in the figure that the original absorption curve is entirely recovered after heating to 155° C. Also, even after heating to 220° C., it can be seen that cooling to room temperature regenerates most of the original absorption curve (the absorption edge has been slightly shifted to higher energies and the material absorbs more short wavelength radiation as a result of this high temperature cycling). Thus, the thermochromic behavior of this material is reversible to temperatures as high as 220° C.

EXAMPLE 8

Figure 6:
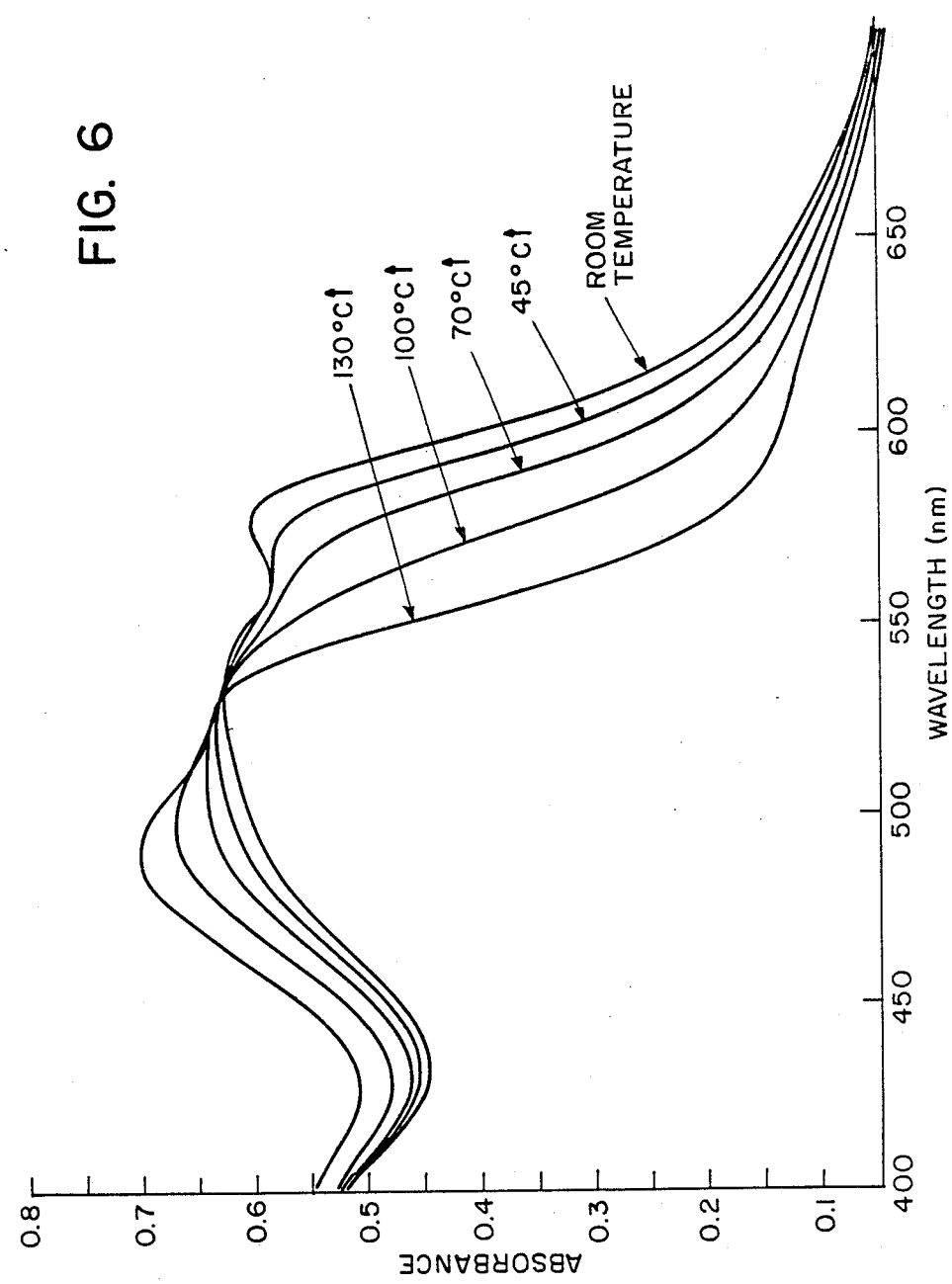
FIG. 6 depicts a graph of the visible absorption spectra of a thin film of cross-polymerized 8,8 aliphatic polyamide-diacetylene recorded during a heating cycle (arrows indicate heating).
Figure 7:
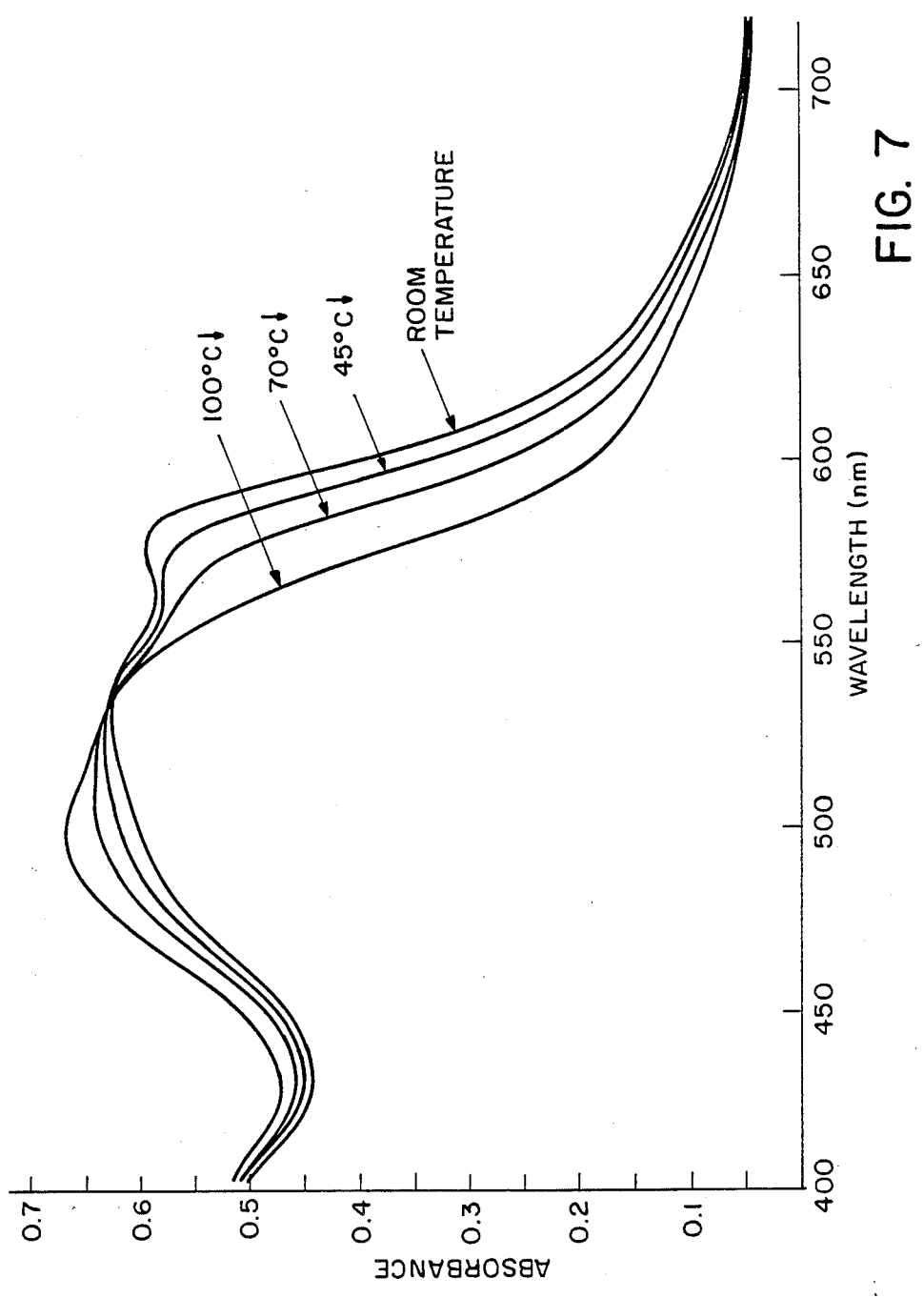
FIG. 7 depicts a graph of the visible absorption spectra of a thin film of cross-polymerized 8,8 aliphatic polyamide-dacetylene recorded during a cooling cycle (arrows indicate cooling).

Reversibility of Thermochromic Properties of 8,8 Aliphatic Polyamide-diacetylene The visible absorption spectra of a thin film of cross-polymerized (20 minute exposure to UV light of 5 Mw/cm$^2$ power density) 8,8 aliphatic polyamide-diacetylene recorded as a function of increasing temperature are shown in FIG. 6. The spectra of the same material recorded during a cooling cycle are found in FIG. 7. These figures show that there is no hysteresis observed during the cooling and heating cycles of this material. The cross-polymerized polymer could be repeatedly cycled from room temperature to 130° C. without any indication of hysteresis. In addition, no changes were observed in any of the absorption curves recorded at any temperature between these two temperatures during the temperature cycling.

EXAMPLE 9

Figure 8:
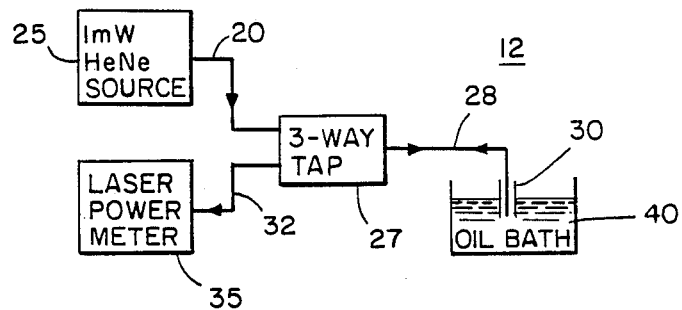
FIG. 8 illustrates a schematic of an experimental set-up for the evaluation of fiber optic temperature sensors.

8,8 Aromatic Polyamide-Diacetylene as a Sensing Element in a Fiber Optic Temperature Sensor The 8,8 aromatic polyamide-diacetylene was evaluated as a sensing element using the fiber optic system shown in FIG. 8.

The fiber optic system 12 of FIG. 8 consists of a 1 Mw HeNe laser source 25 which transmits a laser beam through optical fiber 20 into a LANtap GTE coupler 27 which directs the laser beam through another series of optical fibers 28. A fiber cap 30 of FIGS. 8 and 9 lies at the end of the optical fiber 28. A mirror 11, part of the fiber cap 30, FIGS. 8,9, then reflects the light back through the optical fiber 28. The light travels into the LANtap GTE Coupler 27 which directs it through another series of optical fibers 32 into a laser power meter 35 which measures the intensity of the light.

Figure 9:
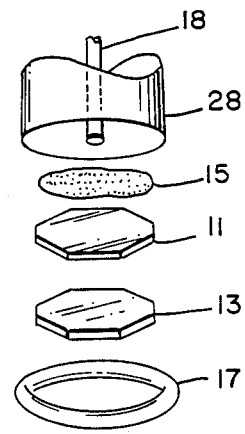
FIG. 9 is a composite diagram of the fiber cap and optical fiber used in the Fiber Optic System depicted in FIG. 8.

The fiber cap is comprised of a glass cover slip 13, FIG. 9, onto which a silver mirror 11 fits. Onto the silver mirror is placed a sample of the polymer 15. The entire assemblage is then attached by means of an epoxy resin 17 to the end of the optical fiber 28 distal from the LANtap GTE Coupler 27. The end cap is so placed onto the end of optical fiber 28 such that the glass core 18 of the optical fiber, FIG. 8 and 9 is in contact with the polymer sample 15.

Accordingly, a thin film of the polymer 8,8 aromatic polyamide-diacetylene, as in 15 FIG. 9, was cast onto a silver mirror 11 from a solution of 0.1 grams of 8,8 aromatic polyamide-diacetylene in 20 ml of m-cresol. The coated mirror 11 was then exposed to U.V. light for 30 minutes (254 nm, 5 Mw/cm$^2$ intensity) to cross-polymerize the polymer. The fiber cap was then assembled as previously described.

Figure 10:
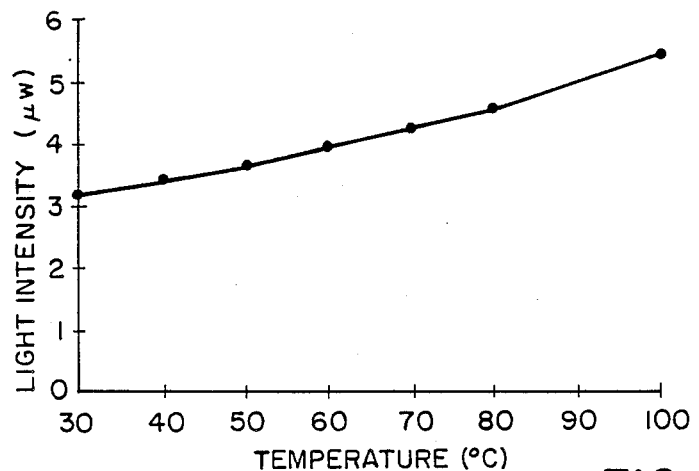
FIG. 10 is a plot showing light intensity versus temperature for the thermochromic 8,8 aromatic polyamide-diacetylene (evaluated using a fiber optic set-up shown in FIGS. 8 and 9).

The fiber cap was then placed in an oil bath 40. A laser beam was then transmitted by the laser source 25. Backscattered light, which was reflected from the surface of the mirror, was directed to the detector 35 by the LANtap GTE Coupler 27. This was repeated a number of times, each time the oil bath 40 being at a different temperature. A graph of light intensity versus temperature was then generated by this procedure as shown in FIG. 10.

These data show that it is possible to optically detect temperature by monitoring changes in the attenuation of the backscattered laser light which occur as the absorption band of the polymer shifts with temperature. These results show that the unique properties of the polymers can be exploited in optical sensor applications. The excellent film forming properties and mechanical properties of these polymers are well suited for this application.

INDUSTRIAL APPLICABILITY

The invention described herein relates to polyamide-diacetylenes. These materials are useful in thermal sensing devices, and as irradiation-crosslinkable polyamides, photoresist films, and high strength polymers.

EQUIVALENTS

Those skilled in the art will recognize or be able to ascertain, using no more than routine experimentation, many equivalents to the specific embodiments described herein. Such equivalents are intended to be covered by the following claims.

I claim:

1. A thermochromic polyamide produced by cross-polymerizing diacetylene units of a polyamide-diacetylene having repeat units of the following formula:

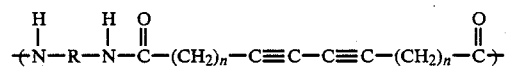

wherein n is an integer between 3 and 10 and R is an organic radical.

2. A thermochromic polyamide produced by cross-polymerizing diacetylene units of a polyamide-diacetylene having repeat units of the following formula:

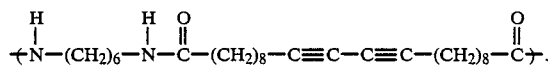

3. A thermochromic polyamide produced by cross-polymerizing diacetylene units of a polyamide-diacetylene having repeat units of the following formula:

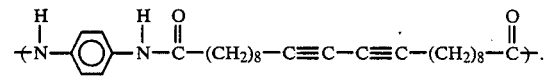

4. A thermochromic polyamide produced by cross-polymerizing diacetylene units of a polyamide-diacetylene having repeat units of the following formula:

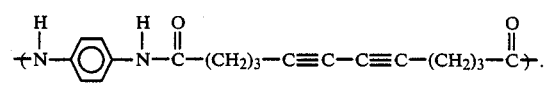

* * * * *